No. 810,881. PATENTED JAN. 23, 1906.
L. S. PFOUTS.
MOTOR VEHICLE.
APPLICATION FILED APR. 1, 1905.
3 SHEETS—SHEET 1.
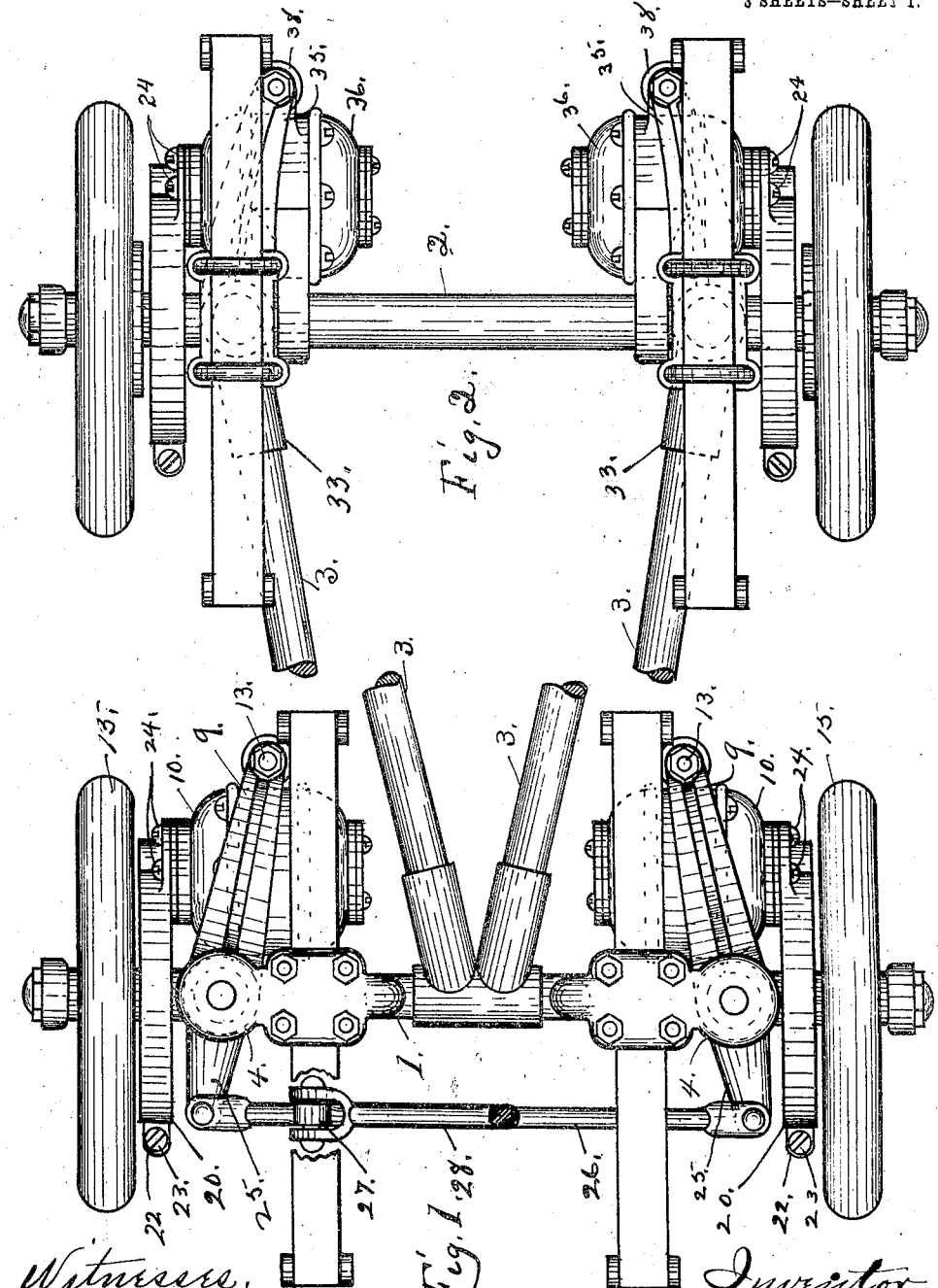

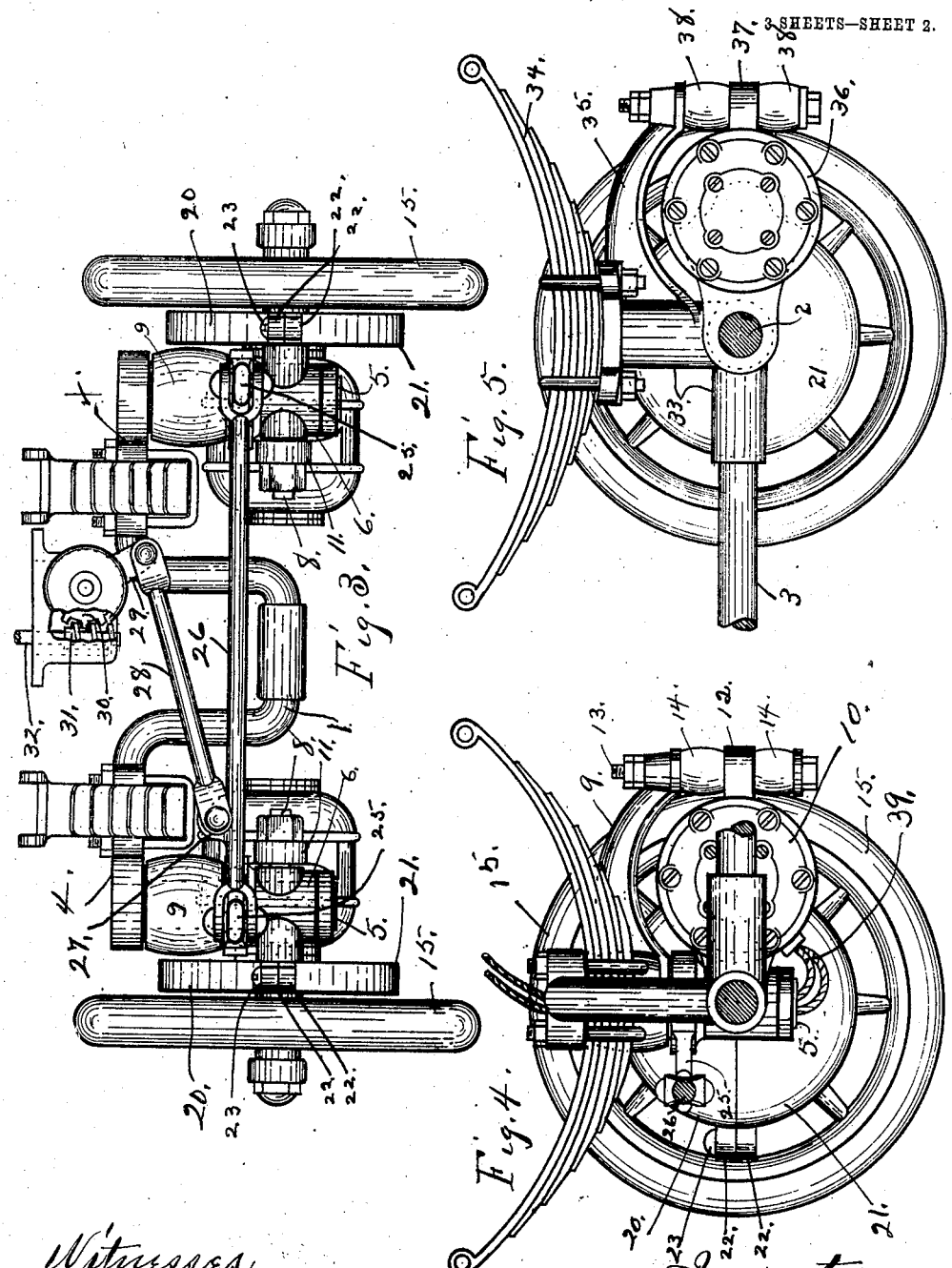

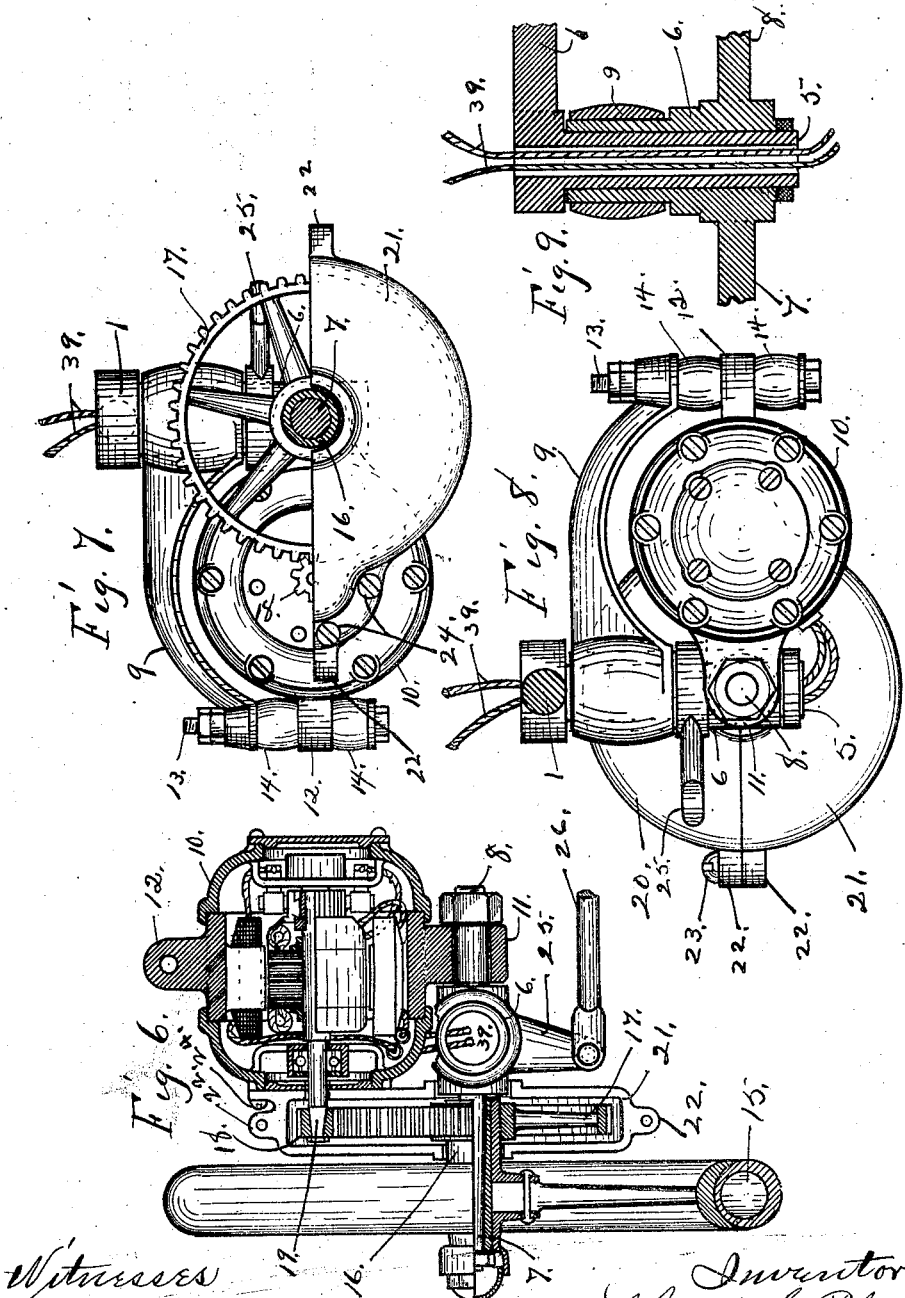

UNITED STATES PATENT OFFICE.

LEROY S. PFOUTS, OF CANTON, OHIO.

MOTOR-VEHICLE.

No. 810,881.

Specification of Letters Patent.

Patented Jan. 23, 1906.

Application filed April 1, 1905. Serial No. 253,376.

*To all whom it may concern:*

Be it known that I, LEROY S. PFOUTS, a citizen of the United States, residing at Canton, in the county of Stark and State of Ohio, have invented certain new and useful Improvements in Motor-Vehicles; and I do hereby declare that the following is a full, clear, and exact description of the same, reference being had to the annexed drawings, making a part of this specification, and to the numerals of reference marked thereon, in which—

Figure 1 is a top view of the forward axle and forward traveling wheels and the different parts pertaining to the forward portion of the vehicle. Fig. 2 is a top view of the rear axle, the traveling wheels, motors, and the different parts pertaining to the rear part of the vehicle. Fig. 3 is a front view of the forward axle, showing the different parts pertaining thereto, such as the traveling wheels, motors, and steering devices. Fig. 4 is a side view of one of the forward wheels, showing a transverse section of the forward axle and illustrating one of the motors properly connected. Fig. 5 is a similar view of one of the hind wheels and axle. Fig. 6 is a top view of one of the front traveling wheels and a horizontal section of one of the motors, showing a portion of the traveling wheels in section and the driving-pinion in section and a part of the gear in section. Fig. 7 is a side view of one of the motors and gear and the motor-supporting arm, showing one section of the gear-casing removed. Fig. 8 is a similar view looking from the opposite side from the one illustrated in Fig. 7. Fig. 9 is a section showing one of the extreme upper ends of the forward axle, its integral motor, and traveling-wheel pivoting-shank, and the traveling-wheel stub-axle, the motor-attaching stub, and the conducting-wires properly arranged with reference to said parts.

The present invention has relation to motor-vehicles; and it consists in the peculiar arrangement and construction hereinafter described, and particularly pointed out in the claims.

Similar numerals of reference indicate corresponding parts in all the figures of the drawings.

In the accompanying drawings, 1 represents the forward axle, and 2 the rear axle, which axles are held in proper spaced relation by means of the reaches 3. The forward axle 1 is provided with the elevated and outward-extending portions or necks 4, which are provided with the bearing-shanks 5. For the purpose hereinafter described the extreme outer ends of the outward-extending portions and the shanks 5 are formed hollow. Upon the shanks 5 are located the sleeves 6, which sleeves are provided with the stub-axles 7 and the motor-supporting stubs 8. Said sleeves, stub-axles, and motor-supporting shanks are preferably formed integral with the sleeve 6. Upon the upper ends of the sleeves 6 and below the forward-extending portions of the axle 1 are attached the arms 9, which arms are for the purpose of providing supports for the motors, their casings, and gear-casings. To the supporting-stub 8 are attached the motors 10 by means of the apertured lug 11. For the purpose of supporting the opposite side of the motors 10 the lugs 12 are provided, which lugs are connected to the outer ends of the arms 9 by means of the bolts 13, and for the purpose of cushioning the motors and the different parts pertaining thereto the rubber bumpers or springs 14 are provided, which rubber bumpers or springs are located substantially as shown in Figs. 4, 5, 7, and 8. The traveling wheels 15 are provided with the hubs 16, and to which hubs are securely attached the gear-wheels 17, said traveling wheels, their hubs, and the gear-wheels being loosely mounted upon the stub-axles 7. The motor-pinion 18 meshes with the gear-wheels 17, said pinion being securely fixed to the motor-shaft 19.

I do not deem it necessary to describe the motors as to their detailed construction, owing to the fact that the present invention has no specific relation to motors, except that motors are to be employed in my peculiar construction, and their adaptation to the propelling of the traveling wheels of the vehicle regardless of the angularity of the traveling wheels, except that the motors should be of such a construction as to size and arrangement that they will follow the movements of the wheels when the wheels are brought or moved into an angle for the purpose of steering the vehicle proper.

The horizontal movements of the traveling wheels, the motors, and the gears are from common centers, and the common centers are the bearing-shanks 5. The horizontal movement just above referred to is the movement relative between the axle and the different parts carried by the axle, such movements being the movements imparted to the traveling wheels for the purpose of steering and guiding the vehicle proper. For the purpose of inclosing the gearing the casing members 20 and 21 are provided, one being the upper casing and the other the lower one, said members being connected together by means of the flanges 22 and the bolts 23, and for the purpose of holding said casing members in proper relative position suitable screws 24 are provided, which screws are seated into the motor-casing. The sleeves 6 are provided with the integral forward-projecting arms 25, which arms are connected together by means of the rod 26, by which arrangement the sleeves 6, together with the different parts movable with the sleeve, move in unison. For the purpose of imparting movement to the connecting-rod 26 said connecting-rod is provided with the flange 27 or its equivalent, to which is pivotally attached the rod 28, which rod is pivoted at its opposite end to the arm 29, which arm is preferably formed integral with the worm-wheel 30, which worm-wheel is rotated by means of the screw 31, which screw meshes with the teeth of the worm-wheel. It will be understood that the shaft 32 of the screw 31 should be extended upward and provided with a suitable crank or wheel.

The devices pertaining to the steering part are conventional only, and I do not desire to be confined to any precise arrangement, but have illustrated the same for the purpose of showing a system for steering the vehicle. To the rear axle 2 are attached the angled brackets 33, which brackets are for the purpose of providing means for connecting the rear ends of the reach-bars 3 and also providing means for attaching the rear springs 34. The upright portions of the brackets 33 are provided with the arms 35, which arms support the rear motors 36, which rear motors are provided with the attaching-flanges 37, said flanges being located between the rubber bumpers 38, by which arrangement the rear motors are cushioned. The gearing for the rear driving-wheels is substantially the same as that for the forward wheels, and, if desired, the mechanism shown connected to the forward axle may be connected to the rear axle when the rear axle is bent in like manner to that of the forward axle, and when so constructed the rear parts of the vehicle would be a duplicate of the forward parts and all four of the traveling wheels could be turned at an angle to the axle in the same manner that the forward wheels are turned.

It will be understood that by forming the bearing-shanks 5 hollow and the ends of the axle 1 with openings the conducting-wires 39 can be carried through the shanks 5, and they will not be disturbed in any manner during the time the various parts carried and journaled to the shanks 5 are changed from one position to another, owing to the fact that they are located at the pivotal center of the parts pivoted to the shanks 5. It will be understood also that there is absolutely no bending or twisting or straining of the connecting-wires at any time during any of the movements of the motors, the gears, and the traveling wheels.

It will be understood that by my peculiar arrangement I provide a motor for each traveling wheel and support the motor in proper operative relation with the traveling wheels independent of the body of the vehicle, by which arrangement there is no rigid connection as between the body of the vehicle and the motors, and that the motors never change their position, regardless of the movements of the vehicle-body relative to the running-gear supporting the body.

For the purpose of securing the sleeve 6 together with the different parts located upon the shanks 5 and preventing any looseness or accidental displacement of the parts the nuts 6ª are provided, which nuts are located upon the lower ends of the shanks 5.

It will be understood that by connecting the casing members 21 and 22 securely to the motor-casing and around or to the stub-axles said casings act as a tie between the motor-pinion and the driving-gear, so that there can be no possible relative movement as between the gear and the motor-pinion, or, in other words, a rigid connection is maintained between the motor-pinion and the gear and said parts are held under all circumstances in proper mesh with each other.

Having fully described my invention, what I claim as new, and desire to secure by Letters Patent, is—

1. In a motor-vehicle, an axle provided with hollow bearing-shanks and wires located therethrough, sleeves loosely mounted upon the shanks and provided with motor-supporting stubs and stub-axles, motors secured to the stubs, arms journaled concentrically with the sleeves upon the shanks, means for communicating rotary motion from the motors to the traveling wheels, and the motors, traveling wheels and means for communicating rotary motion to said traveling wheels having common pivotal points, substantially as and for the purpose specified.

2. In a motor-vehicle, an axle provided with hollow bearing-shanks, motors carried by the shanks, gear and traveling wheels carried by the shanks, all of said parts carried by the shank and gear-casings provided with a common center, substantially as and for the purpose specified.

3. In a motor-vehicle, an axle provided with hollow bearing-shanks, motors carried by the shanks, gear and traveling wheels carried by the shanks, and all of said parts carried by the shanks provided with a common center, and the connecting-wires located through the hollow shanks, substantially as and for the purpose specified.

4. In a motor-vehicle an axle provided with vertical bearing-shanks, motors and gear and traveling wheels carried upon opposite sides of the vertical shanks, and all of said parts carried by the shanks, substantially as and for the purpose specified.

5. In a motor-vehicle, the combination of an axle provided with hollow bearing-shanks, sleeves loosely mounted upon the bearing-shanks, and provided with motor-attaching stubs, and stub-axles, arms journaled concentrically with the sleeves upon the axle-shanks, motors supported by the stubs upon the sleeves and arms, substantially as and for the purpose specified.

6. In a motor-vehicle, the combination of an axle provided with hollow bearing-shanks, sleeves loosely mounted upon the bearing-shanks and provided with motor-stubs and stub-axles, arms journaled concentrically with the sleeves upon the axles and adapted to support the rear ends of the motors, and means for cushioning the motors, substantially as and for the purpose specified.

7. In a motor-vehicle, the combination of an axle provided with bearing-shanks, sleeves loosely mounted upon the bearing-shanks, and provided with motor-attaching stubs, and stub-axles, arms journaled concentrically with the sleeves upon the axle-shanks, motors supported by the stubs upon the sleeves and arms, and means for cushioning the motors, and means for steering, substantially as and for the purpose specified.

8. In a motor-vehicle, an axle provided with vertical bearing, sleeves loosely mounted upon the vertical bearings, and provided with means for carrying the traveling wheels, and motors and arms adapted to carry the rear ends of the motors, gear and gear-casings, all arranged substantially as and for the purpose specified.

9. In a motor-vehicle, an axle, motors, gear and traveling wheels all of said parts having a common and vertical pivoted bearing upon the axle, and the conducting-wires passed through the common vertical point, substantially as and for the purpose specified.

10. In a motor-vehicle, the combination of an axle provided with bearing-shanks, sleeves loosely mounted upon the bearing-shanks and provided with motor-stubs and stub-axles, gear-casings fixedly connected to the motor-casing and around or to the stub-axles, a motor-pinion and a gear-wheel meshing with the motor-pinion, substantially as and for the purpose specified.

In testimony that I claim the above I have hereunto subscribed my name in the presence of two witnesses.

LEROY S. PFOUTS.

Witnesses:
J. A. JEFFERS,
F. W. BOND.